Patented June 24, 1930

1,766,592

UNITED STATES PATENT OFFICE

JOSEPH BLUMENFELD, OF PARIS, FRANCE, ASSIGNOR TO COMMERCIAL PIGMENTS CORPORATION, OF NEW YORK, N. Y., A CORPORATION OF DELAWARE

PRODUCTION OF COMPOSITE PIGMENTS CONTAINING TITANIUM DIOXIDE

No Drawing.   Application filed March 13, 1928.   Serial No. 261,421.

My invention relates to a process for producing composite pigments containing titanium dioxide and pertains more especially to a means for coating secondary pigment particles with particles of $TiO_2$, many of which are ultra-microscopic in size. In the present specification the term "secondary pigment" is used to denote any other pigment with which it is desired to blend titanium dioxide.

Titanium dioxide, which is also described in the older literature as titanium hydrate, hydrated titanic acid, and titanium hydroxide, is a white substance possessing superior pigment qualities. It is characterized by its very high opacity or "hiding power" and hence is a most suitable material for admixture with other pigments to produce composite pigments.

In the prior art, many proposals have been made for the admixture of titanium dioxide with secondary pigments such as zinc oxide, barium sulfate, white lead, calcium sulfate, lithopone, and the like. Composite pigments have been prepared by the simple mixing of titanium dioxide with secondary pigments, this mixing having been accomplished in both dry and wet conditions. Various other schemes have been advanced in which titanium dioxide has been precipitated from solutions, by chemical means, in the presence of particles of secondary pigment.

The present invention relates to an improvement in the production of composite pigments and comprises an easily controllable process, free from such complicating problems as are involved in the use of elevated temperatures or pressures, or highly corrosive solutions, by which particles of secondary pigment may be coated with particles of titanium dioxide, many of which are of ultra-microscopic size. The process consists in suspending particles of secondary pigment in an aqueous colloidal dispersion of titanium dioxide and coagulating titanium dioxide on said particles, by destroying said dispersion.

The composite pigment thus produced is then recovered by filtration and may be washed, dried, or calcined as desired.

A suitable colloidal dispersion of titanium dioxide may be prepared from titanium dioxide precipitated from titanium solutions by hydrolysis. Titanium dioxide precipitated by the hydrolysis of titanium-sulfuric acid solutions, as described in my U. S. Patent 1,504,672, is in the meta-titanic form, since it is the result of a precipitation from a hot solution. For this reason, colloidal $TiO_2$ prepared from this material is insoluble in acids, and thus differs from colloidal ortho-titanic acid (ortho-titanium dioxide), which has been described in the scientific literature. Titanium dioxide prepared by the hydrolysis of a sulfate solution will contain from 3–8% of adsorbed sulfuric acid, and it is necessary to remove this acid before the colloidal dispersion may be produced. This may be conveniently accomplished by washing the precipitate with an alkaline solution to neutralize the acid, after which the salts of reaction are removed by ordinary washing.

The aqueous colloidal dispersion may be prepared as follows:

To 1 kilogram of precipitated $TiO_2$ in the form of a moist filter cake containing about 60% water there is added 60 grams of hydrochloric acid (HCl) in the form of either concentrated or dilute water solution, as desired. The acid is incorporated with the filter cake by any convenient method of admixture, whereupon the mass becomes entirely fluid, owing to the conversion of the precipitated $TiO_2$ to the colloidal form, the result being a suspension or dispersion of the particles in the water formerly adsorbed by the precipitated $TiO_2$ filter cake. This phenomenon is known as peptization and the product is ordinarily described as a "peptized solution."

In place of hydrochloric acid, other substances which diminish the surface tension of the liquid phase may be used in the same manner. For example, nitric acid or hydrobromic acid give the same effect.

In preparing a peptized $TiO_2$ solution for incorporation with secondary pigments, where the presence of a relatively small amount of an inert foreign substance is unobjectionable, I may combine the steps of removing adsorbed sulfuric acid from the $TiO_2$ and peptizing the same. This may be done by mixing the moist precipitated $TiO_2$ (e. g. the filter cake from which the mother liquor has been removed by washing) with a solution of barium chloride or calcium chloride. By this procedure, insoluble barium or calcium sulfate is produced and the free sulfuric acid which inhibits peptization is converted to an unreactive form. The hydrochloric acid generated by the reaction then peptizes the $TiO_2$, as formerly described.

The particles of insoluble sulfate may be removed from the peptized solution by decantation, after settling, but since these substances are white inert materials of pigmentary value, it is not usually necessary to separate them from the peptized solution.

The aqueous colloidal dispersion (peptized solution) of $TiO_2$ thus prepared is then mixed with the secondary pigment. This may be accomplished by adding the dry pigment particles to the peptized solution, with stirring, or by adding the peptized solution to a separate aqueous suspension of the secondary pigment. The colloidal character of the $TiO_2$ is in no way dependent upon the concentration of water present; consequently, one may use as much additional water as is necessary to make the mixing process easy.

When the peptized titanium dioxide solution has been mixed with the secondary pigment, the $TiO_2$ may be thrown out of its colloidally dispersed state and caused to coagulate itself on the pigment particles in a variety of ways. Polybasic acids, such as sulfuric acid or phosphoric acid, inhibit peptization, and the addition of these substances to the peptized solution causes the coagulation of the colloidal particles. The soluble salts of polybasic acids, such for example as the sodium or potassium salts, have the same effect and may be used in place of the acids for the same purpose.

Alternatively, one may add an alkaline substance, such as aqua ammonia or sodium carbonate solution, which will neutralize the peptizing acid and thus coagulate the colloidal particles.

During the coagulation of the peptized solution, the mixture should preferably be agitated, to insure an even deposition of $TiO_2$ particles on the particles of secondary pigment. After the coagulation of the peptized solution, the composite pigment thus formed is recovered by filtration and is washed to remove soluble materials. It is then dried. The dry product may be calcined, ground, or otherwise treated, prior to actual use as a pigment.

Now, having described my invention, I shall give a specific example of its use:

A peptized $TiO_2$ solution containing approximately 1,200 grams of titanium dioxide colloidally dispersed in an aqueous mixture of about 2,500 grams of water and 70 grams of hydrochloric acid is diluted with an equal volume of water. 5,000 grams of blanc fixe (barium sulfate) is gradually added to this mixture with stirring. When the incorporation is complete, about 50 grams of sulfuric acid (in either concentrated or diluted solution) is added, the stirring being continued. The addition of the sulfuric acid causes the peptized titanium dioxide to be thrown out of the aqueous dispersion and to be coagulated on the secondary pigment particles. Stirring is continued for about half an hour, after which the slurry is put through a filter press, washed with water to remove traces of acid, and dried. In place of sulfuric acid, a soluble sulfate may be employed as the coagulant.

The dry mass may be used as a pigment after being milled sufficiently to break up any large fragments formed during the drying operation, though calcination at 900–1000° for a few minutes will improve its properties. In this manner a composite pigment containing about 20% of titanium dioxide in the form of extremely small particles, some of which are of ultra-microscopic size, is prepared. The titanium dioxide particles are precipitated in the pores of the blancfixe particles, and a pigment of superior hiding power results.

The specific example described is merely illustrative and wide variations may be made without departing from the spirit of the invention. For example, in place of blanc fixe, any other secondary pigment might be used in exactly the same manner. Among such secondary pigments the following may be mentioned: silica, white lead, ground barytes, zinc oxide, zinc sulfide, lithopone, calcium carbonate, barium carbonate, calcium sulfate, etc.

Some of these pigments are easily attacked by dilute acids, such as are used for peptization, but this circumstance does not seriously interfere with the production of the composite pigments. The process of mixing the peptized solution with the secondary pigment is not an extended one and as soon as admixture is completed, coagulation may be immediately produced and the composite pigment may be washed free from acid before much reaction has occurred. In any case, however, the trouble may be obviated by using an alkaline substance such as ammonia or sodium carbonate as the coagulating agent, by which means the peptizing acid is neutralized and any dissolved pigment is re-precipitated.

While in the specific example given, 20% of titanium dioxide was added to the secondary pigment, it is obvious that any other desired proportion might be incorporated by the same method.

Now, having described my invention, I claim:

1. A process which comprises mixing pigment particles with an aqueous colloidal dispersion of titanium dioxide, adding a coagulant, and recovering the composite pigment thus formed.

2. A process which comprises agitating pigment particles in an aqueous colloidal dispersion of titanium dioxide, adding a coagulant, and filtering, washing, and drying the resultant composite pigment.

3. A process which comprises agitating pigment particles in an aqueous mixture containing colloidal titanium dioxide and a peptizing quantity of a monobasic acid, adding a coagulant, and recovering the composite pigment thus formed.

4. A process which comprises agitating pigment particles in an aqueous mixture containing colloidal titanium dioxide and a peptizing quantity of hydrochloric acid, adding sulfuric acid to coagulate the colloidal titanium dioxide and recovering the composite pigment thus formed.

5. A process which comprises mixing one of the pigments of the group consisting of silica, barium sulphate, calcium sulphate and lithopone with an aqueous colloidal dispersion of titanium dioxide, adding a coagulant and recovering the composite pigment thus formed.

6. A process which comprises mixing pigment particles in an aqueous mixture containing colloidal titanium dioxide, adding a polybasic acid to coagulate the colloidal titanium dioxide and recovering the composite pigment thus formed.

7. A process which comprises mixing pigment with an aqueous colloidal dispersion of titanium dioxide, adding a coagulant, recovering the composite precipitate thus formed, and calcining it at 900–1000° C.

8. A process which comprises mixing titanium dioxide filter cake with a solution of alkaline earth chloride to produce a peptized titanium dioxide solution, mixing a pigment with the peptized titanium dioxide solution, adding a coagulant and recovering the composite pigment thus formed.

JOSEPH BLUMENFELD.